United States Patent
Chiba et al.

(10) Patent No.: US 11,661,112 B2
(45) Date of Patent: May 30, 2023

(54) INSTRUMENT PANEL STRUCTURE OF VEHICLE

(71) Applicant: Honda Motor Co., Ltd., Tokyo (JP)

(72) Inventors: Hiroshi Chiba, Tokyo (JP); Toru Okinaga, Tokyo (JP); Sho Kobayashi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 17/141,231

(22) Filed: Jan. 5, 2021

(65) Prior Publication Data

US 2021/0206433 A1  Jul. 8, 2021

(30) Foreign Application Priority Data

Jan. 6, 2020  (CN) .......................... 202010008992.8

(51) Int. Cl.
*B62D 25/14*  (2006.01)
(52) U.S. Cl.
CPC ......... *B62D 25/145* (2013.01); *B62D 25/142* (2013.01)
(58) Field of Classification Search
CPC .... B62D 25/145; B62D 25/142; B60K 37/02; B60R 2011/0042; B60R 2011/0005
USPC ..................................................... 296/70, 72
See application file for complete search history.

(56) References Cited

U.S. PATENT DOCUMENTS

| | | | | |
|---|---|---|---|---|
| 5,556,153 A | * | 9/1996 | Kelman | B60H 1/0055 296/192 |
| 2003/0155793 A1 | * | 8/2003 | Yoshihara | B62D 25/142 296/208 |
| 2009/0284038 A1 | * | 11/2009 | Sato | B60K 37/00 296/72 |
| 2014/0232140 A1 | * | 8/2014 | Nagai | B60R 11/0235 296/193.02 |
| 2020/0174306 A1 | * | 6/2020 | Faraj | B60K 37/04 |
| 2020/0262357 A1 | * | 8/2020 | Kuchibhatla | H05K 5/0017 |

FOREIGN PATENT DOCUMENTS

| | | | |
|---|---|---|---|
| DE | 19843211 A1 * | 3/1999 | ........ B62D 25/145 |
| JP | 2014177148 | 9/2014 | |

* cited by examiner

*Primary Examiner* — Jason S Morrow
*Assistant Examiner* — Wenwei Zhuo
(74) *Attorney, Agent, or Firm* — JCIPRNET

(57) ABSTRACT

The disclosure provides an instrument panel structure of a vehicle, which is connected to a steering device of the vehicle and configured to mount an in-vehicle device. The instrument panel structure of the vehicle includes an the instrument panel, a hanger beam member, and a bracket. The instrument panel has an instrument panel upper portion, and an instrument panel middle portion located below the instrument panel upper portion and having an opening for placing the in-vehicle device. The hanger beam member is configured to support the instrument panel and extends in a left-right direction of the vehicle and is connected between a left side and a right side of a vehicle body. The bracket is disposed on the hanger beam member and configured to support the in-vehicle device. The in-vehicle device and the instrument panel middle portion are connected to the hanger beam member via the bracket.

6 Claims, 7 Drawing Sheets

INSTRUMENT PANEL STRUCTURE OF VEHICLE

CROSS-REFERENCE TO RELATED APPLICATION

This application claims the priority benefit of China application serial no. 202010008992.8, filed on Jan. 6, 2020. The entirety of the above-mentioned patent application is hereby incorporated by reference herein and made a part of this specification.

BACKGROUND

Technical Field

The disclosure relates to an instrument panel structure of a vehicle, and more particularly, to an instrument panel structure of a vehicle for mounting an in-vehicle display device.

Description of Related Art

In the related art, there is a mounting structure of an in-vehicle device for disposing an in-vehicle display upright on a vehicle instrument panel. For example, as shown in Patent Document 1 (Japanese Patent Application Laid-Open No. 2014-177148), Patent Document 1 provides a mounting structure of an in-vehicle device. When an in-vehicle display is disposed upright on the upper portion of the vehicle instrument panel, the mounting structure can suppress the increase in the number of parts and the assembly processes and also ensure the support rigidity for the in-vehicle display. The mounting structure of the in-vehicle device in Patent Document 1 includes a display disposed upright on the instrument panel, a box-shaped control unit disposed inside the instrument panel, a frame body which forms a continuous surface with the surface of the instrument panel, a reinforcement plate provided on the lower surface of the frame body, and a connection member which clamps the frame body and integrates the display device and the control unit. The outer peripheral part of the frame body is engaged to an instrument panel opening formed in the instrument panel, and the in-vehicle device is supported on a peripheral edge of the instrument panel opening.

However, in the mounting structure of the in-vehicle device of Patent Document 1, structures such as the frame body, the reinforcement plate, and the connection member are additionally disposed on the instrument panel to support the in-vehicle display. In the related art, in order to support an in-vehicle display disposed upright on the upper portion of the instrument panel, it is required to dispose additional support structures on the instrument panel. Such a configuration will still increase the number of parts and complicate the assembly process, and the weight of the in-vehicle device will be limited by the load that the instrument panel can support.

SUMMARY

According to technical solution 1, in an instrument panel structure of a vehicle, the instrument panel structure is connected to a steering device of the vehicle and configured to mount an in-vehicle device. The instrument panel structure of the vehicle includes an instrument panel, a hanger beam member, and a bracket. The instrument panel has an instrument panel upper portion and an instrument panel middle portion. The instrument panel middle portion is located below the instrument panel upper portion and has an opening for placing the in-vehicle device. The hanger beam member is configured to support the instrument panel and extends in a left-right direction of the vehicle and is connected between a left side and a right side of a vehicle body. The bracket is disposed on the hanger beam member and configured to support the in-vehicle device. The in-vehicle device and the instrument panel middle portion are connected to the hanger beam member via the bracket.

DESCRIPTION OF THE EMBODIMENTS

Figure 1:
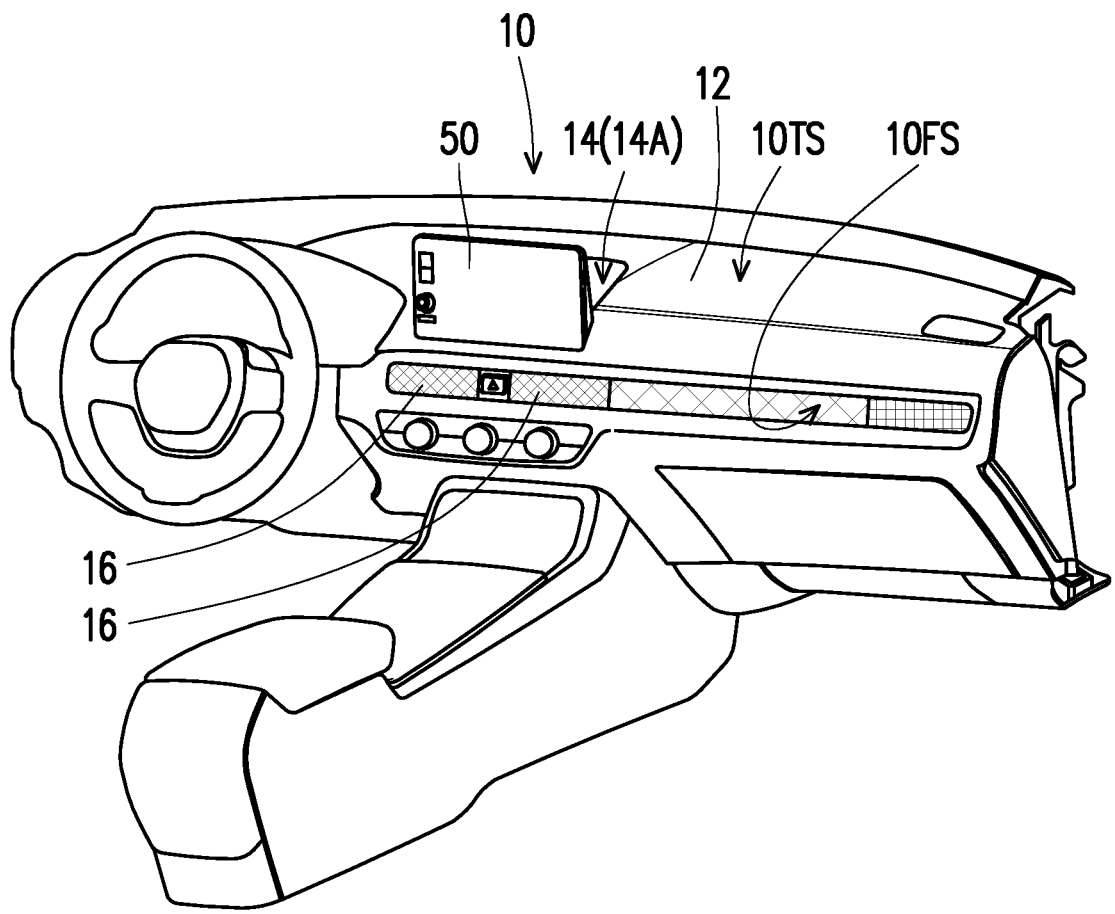
FIG. 1 is a schematic view of an instrument panel structure of a vehicle in an embodiment of the disclosure.
Figure 1:
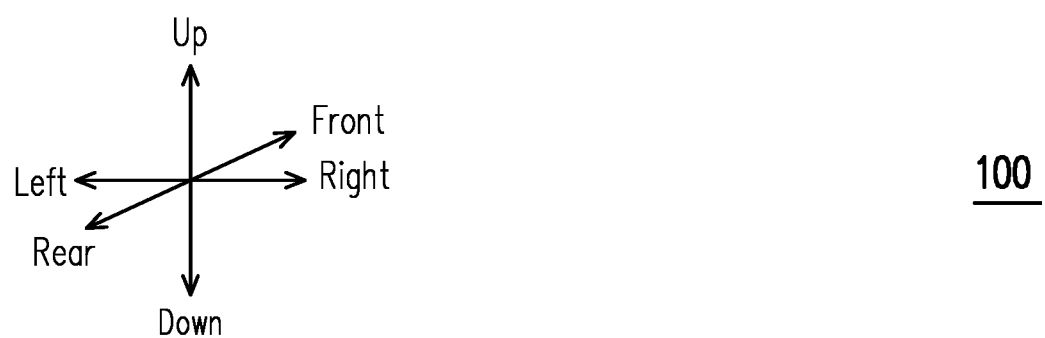

The disclosure provides an instrument panel structure of a vehicle in which an in-vehicle device and an instrument panel support member of the vehicle are connected to each other via a single bracket member, so that it is possible to reduce the number of parts and simplify the assembly process, and meanwhile also increase the weight that the instrument panel structure can support.

According to technical solution 1, in an instrument panel structure of a vehicle, the instrument panel structure is connected to a steering device of the vehicle and configured to mount an in-vehicle device. The instrument panel structure of the vehicle includes an instrument panel, a hanger beam member, and a bracket. The instrument panel has an instrument panel upper portion and an instrument panel middle portion. The instrument panel middle portion is located below the instrument panel upper portion and has an opening for placing the in-vehicle device. The hanger beam member is configured to support the instrument panel and extends in a left-right direction of the vehicle and is connected between a left side and a right side of a vehicle body. The bracket is disposed on the hanger beam member and configured to support the in-vehicle device. The in-vehicle device and the instrument panel middle portion are connected to the hanger beam member via the bracket.

Accordingly, the in-vehicle device and the instrument panel structure of the vehicle are connected to each other via the bracket which is a single component to support the in-vehicle device. The load of the in-vehicle device is supported by the hanger beam member via the bracket, and the hanger beam member meanwhile provides support to the load of the instrument panel. Without additionally disposing other components, it is possible to reduce the number of parts and simplify the assembly process, and meanwhile also increase the weight that the instrument panel structure can support.

In addition, according to technical solution 2, in addition to the configuration of technical solution 1, in the instrument panel structure of the vehicle, the instrument panel has a plurality of air conditioning outlets, and two adjacent air conditioning outlets among the plurality of air conditioning outlets are arranged apart in the left-right direction and are located between the opening and the hanger beam member. When viewed in a front-rear direction of the vehicle, the bracket is arranged so that a connected portion between the bracket and the hanger beam member is located between the two adjacent air conditioning outlets.

Accordingly, by disposing the bracket in the small space between the adjacent air conditioning outlets, the space is cleverly utilized. Moreover, the bracket is connected between the in-vehicle device and the hanger beam member, so that the hanger beam member supports the in-vehicle device.

In addition, according to technical solution 3, in addition to the configuration of technical solution 2, in the instrument panel structure of the vehicle, the bracket includes a fixing part fixed to a mounting extension part of the hanger beam member and an arm fixed to a connection part of the in-vehicle device, and the connected portion is located at the fixing part. When viewed in the front-rear direction, the mounting extension part passes between the two adjacent air conditioning outlets and is located between the in-vehicle device and the hanger beam member in an up-down direction of the vehicle.

Accordingly, the existing space is cleverly utilized, and overall aesthetics can also be enhanced.

In addition, according to technical solution 4, in addition to the configuration of technical solution 2, in the instrument panel structure of the vehicle, the two adjacent air conditioning outlets are arranged on a front surface of the instrument panel facing inside of a cabin, and the instrument panel further includes a predetermined operation part formed on the front surface. The opening of the instrument panel is formed on an upper surface of the instrument panel which extends from the front surface toward a windshield of the vehicle and faces an upper side of the vehicle.

Accordingly, the operability of the instrument panel can be improved.

In addition, according to technical solution 5, in addition to the configuration of technical solution 3, in the instrument panel structure of the vehicle, the connection part of the in-vehicle device includes a support part extending toward a windshield of the vehicle in the front-rear direction, the support part is configured to contain an in-vehicle appliance, and the support part is supported by the bracket and is located in the opening and below the instrument panel middle portion.

Accordingly, the hanger beam member provides support to the in-vehicle appliance contained in the support part, so that it is possible to reduce the number of parts and simplify the assembly process and meanwhile also increase the weight that the instrument panel structure can support.

In addition, according to technical solution 6, in addition to the configuration of technical solution 1, in the instrument panel structure of the vehicle, a plurality of welding fixing parts are formed between the instrument panel upper portion and the instrument panel middle portion, so that the instrument panel upper portion and the instrument panel middle portion are welded and fixed to each other.

Accordingly, the instrument panel upper portion and the instrument panel middle portion are fixed to each other by welding, so that the hanger beam member provides support to the instrument panel, which makes the fixing operation easier, reduces the number of parts, and simplifies the assembly process.

According to the instrument panel structure of the vehicle of the disclosure, by connecting the bracket which is a single member between the in-vehicle device and the hanger beam member, it is possible to reduce the number of parts and simplify the assembly process, and meanwhile also increase the weight that the instrument panel structure can support without additionally disposing other components.

Hereinafter, embodiments of an instrument panel structure of a vehicle of the disclosure will be described with reference to the accompanying drawings. In addition, in the description of the embodiments, the front-rear direction refers to a direction extending between the front side and the rear side based on the vehicle body, the left-right direction refers to a direction extending between the left side and the right side based on the vehicle body, and the up-down direction refers to a direction extending between the upper side and the lower side based on the vehicle body.

Figure 2:
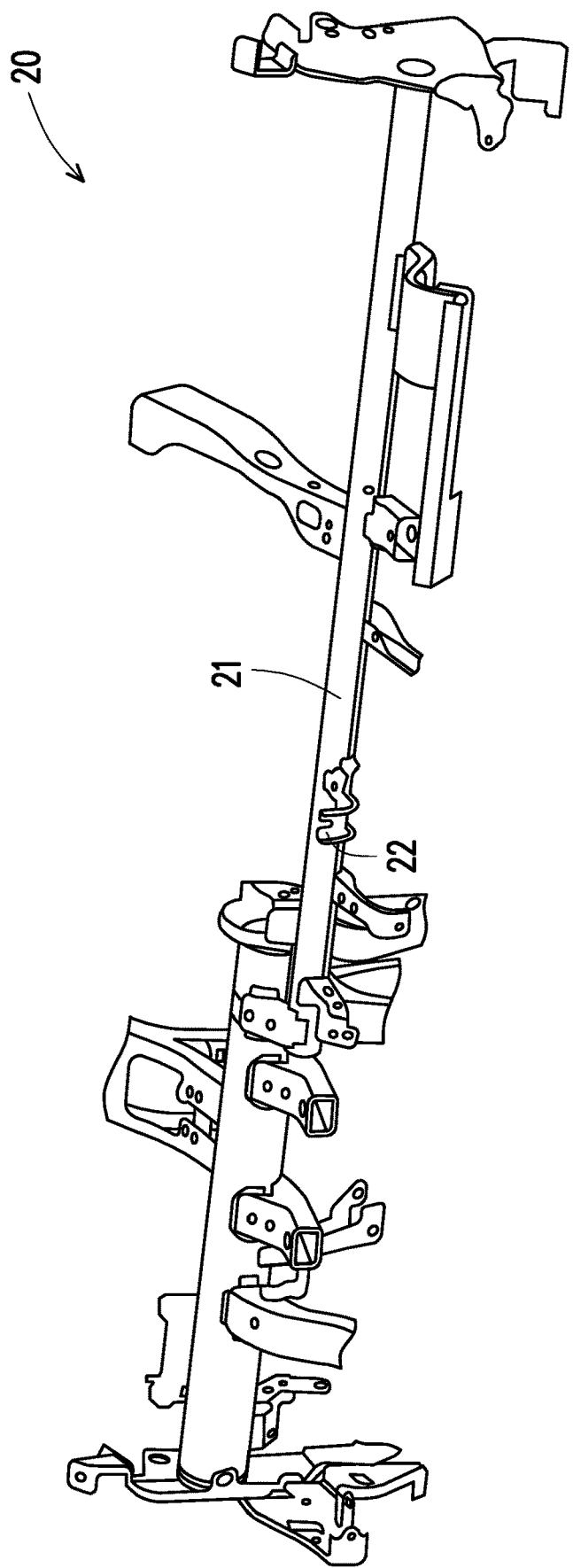
FIG. 2 is a schematic view of a hanger beam member according to an embodiment of the disclosure.
Figure 3:
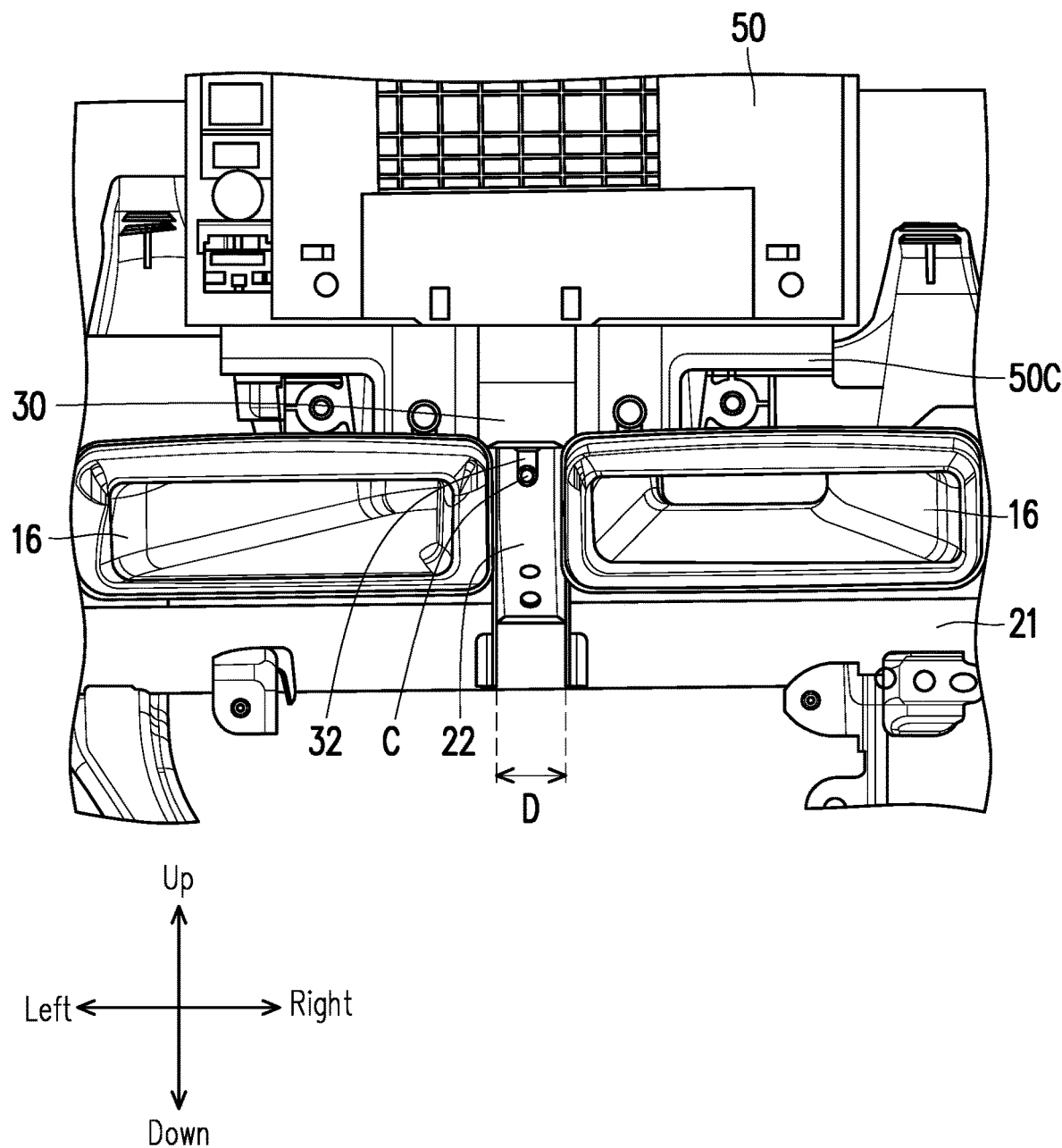
FIG. 3 is a schematic view illustrating configurations of connection portions between air conditioning outlets, the hanger beam member, and a bracket in an embodiment of the disclosure.
Figure 4:
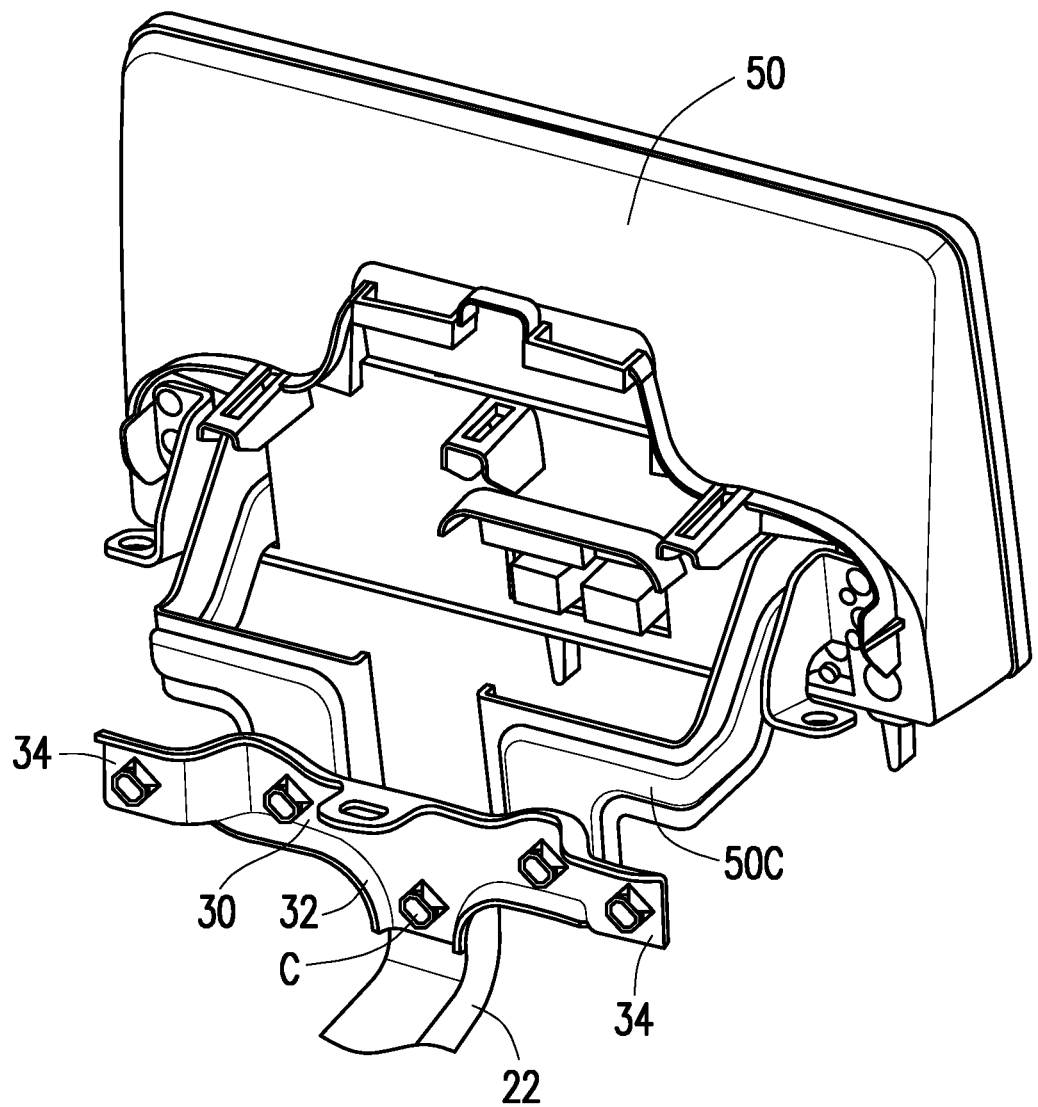
FIG. 4 is a schematic view illustrating fixing of an in-vehicle device to the hanger beam member via the bracket in an embodiment of the disclosure.

FIG. 1 is a schematic view of an instrument panel structure of a vehicle in an embodiment of the disclosure. FIG. 2 is a schematic view of a hanger beam member according to an embodiment of the disclosure. FIG. 3 is a schematic view illustrating configurations of connection portions between air conditioning outlets, the hanger beam member, and a bracket in an embodiment of the disclosure. FIG. 4 is a schematic view illustrating fixing of an in-vehicle device to the hanger beam member via the bracket in an embodiment of the disclosure. In an embodiment, an instrument panel structure 100 of a vehicle is connected to a steering device and is located at the bottom of a windshield of the vehicle. The instrument panel structure 100 is configured to mount an in-vehicle device 50. The in-vehicle device 50 is, for example, a navigation device which displays auxiliary driving support information such as map information, current location information, and simple route guidance information. The in-vehicle device 50 may also be a multimedia device such as a display panel or a TV for playing multimedia information.

Referring to FIG. 1 to FIG. 4, the instrument panel structure 100 includes an instrument panel 10, a hanger beam member 20, and a bracket 30. The instrument panel 10 has an instrument panel upper portion 12 and an instrument panel middle portion 14 located below the instrument panel upper portion 12. In the up-down direction, the position of the instrument panel upper portion 12 is higher than the position of the instrument panel middle portion 14; namely, the instrument panel upper portion 12 is closer to the windshield than the instrument panel middle portion 14. The instrument panel 10 has an upper surface LOTS substantially opposite to the upper side of the vehicle, and a front surface 10FS opposite to the front of the backrest of the driver's seat. In addition, the upper surface LOTS extends from the front surface 10FS toward the windshield of the vehicle and faces the upper side of the vehicle. Further, the upper surface 10TS of the instrument panel 10 extends obliquely from the portion connected with the front surface 10FS toward the windshield of the vehicle, and when viewed in the front-rear direction of the vehicle, the upper surface 10TS of the instrument panel 10 is a sloped surface.

As shown in FIG. 1, the instrument panel 10 has an opening 14A formed in the instrument panel middle portion 14, and the in-vehicle device 50 is placed in the opening 14A. The opening 14A is formed at a position substantially in the middle of the upper surface 10TS of the instrument panel 10 in the left-right direction, and the in-vehicle device 50 may be placed in the opening 14A in an upright manner.

The hanger beam member 20 of the instrument panel structure 100 is arranged under the instrument panel 10 to support the instrument panel 10. As shown in FIG. 1 and FIG. 2, the hanger beam member 20 is, for example, a steering hanger beam connected to a steering device of a vehicle. The hanger beam member 20 is disposed on the front side of the middle portion of the instrument panel 10 in the up-down direction, extends in the left-right direction of the vehicle and is connected between the left side and the right side of the vehicle body, and provides support to a steering shaft (not shown) interconnected with the steering wheel.

The bracket 30 configured to support the in-vehicle device 50 is fixed to the hanger beam member 20, and the in-vehicle device 50 and the instrument panel middle portion 14 are connected to the hanger beam member 20 via the bracket. Accordingly, the load of the in-vehicle device 50 is supported by the hanger beam member 20 via the bracket 30, and the hanger beam member 20 meanwhile provides support to the load of the instrument panel 10. The in-vehicle device 50 and the instrument panel structure 100 of the vehicle are connected to each other via the bracket 30 which is a single member to support the in-vehicle device 50. In addition, the bracket 30 is directly fixed to the existing hanger beam member 20 of the vehicle and is directly connected to the in-vehicle device 50 without additionally disposing other components. As a result, it is possible to reduce the number of parts and simplify the assembly process, and meanwhile also increase the weight that the instrument panel structure can support.

As shown in FIG. 2, a plurality of extension members serving different purposes extend from a beam body 21 of the hanger beam member 20 toward different directions, and a mounting extension part 22 formed at a position of the hanger beam member 20 corresponding to the instrument panel middle portion 14 is configured to mount the bracket 30.

The bracket 30 has a fixing part 32 connected to the hanger beam member 20 and an arm 34 connected to the in-vehicle device 50. The bracket 30 is, for example, a substantially T-shaped plate member and may be made of metal or other hard materials. The fixing part 32 may be fixed to the end of the mounting extension part 22 of the hanger beam member 20 by screw locking, and the arms 34 (two arms 34 are described as an example in the embodiment, as shown in FIG. 4) extending from the fixing part 32 and then extending toward two sides of the fixing part 32 are fixed to a connection part 50C of the in-vehicle device 50.

As shown in FIG. 3 and FIG. 4, the front surface 10FS of the instrument panel 10 is provided with a plurality of air conditioning outlets 16 configured to allow conditioned air to pass, and operation parts configured to operate the air-conditioner or other in-vehicle appliances. As a result, the front surface 10FS can be effectively utilized, and the user's operation convenience can be improved. In the front surface 10FS of the instrument panel 10, two adjacent air conditioning outlets 16 are arranged at a corresponding position for disposing the in-vehicle device 50 upright in the opening 14A of the instrument panel middle portion 14. The two adjacent air conditioning outlets 16 among the plurality of air conditioning outlets 16 are arranged apart from each other in the left-right direction and are located between the opening 14A and the hanger beam member 20. As shown in FIG. 3, the two adjacent air conditioning outlets 16 are arranged apart by a predetermined distance D in the left-right direction, and the two adjacent air conditioning outlets 16 are located between the opening 14A and the hanger beam member 20.

In this embodiment, as shown in FIG. 3, the bracket 30 which is a single member is connected between the in-vehicle device 50 and the hanger beam member 20, and a connected portion C between the bracket 30 and the hanger beam member 20, i.e., the position at which the fixing part 32 of the bracket 30 is fixed to the mounting extension part 22, is correspondingly configured between the two adjacent air conditioning outlets 16. When viewed in the front-rear direction of the vehicle, the bracket 30 is arranged such that the connected portion C between the bracket 30 and the hanger beam member 20 is within the range of the predetermined distance D and may be at the center of the predetermined distance D. When viewed in the front-rear direction, the mounting extension part 22 extending from the hanger beam member 20 toward a back surface LOBS of the upper surface LOTS of the instrument panel 10 is configured to pass between the above two adjacent air conditioning outlets 16, and is located between the in-vehicle device 50 and the beam body 21 of the hanger beam member 20 in the up-down direction of the vehicle. Therefore, when viewed in the front-rear direction, the mounting extension part 22 is sandwiched between the two adjacent air conditioning outlets 16 in the left-right direction, the fixing part 32 of the bracket 30 is located between the two adjacent air conditioning outlets 16, and the arms 34 of the bracket 30 are located between the in-vehicle device 50 and the upper edges of the two adjacent air conditioning outlets 16 in the up-down direction. In other words, the two adjacent air conditioning outlets 16 are located between the arms 34 of the bracket 30 and the beam body 21 of the hanger beam member 20 in the up-down direction and are arranged side by side in the left-right direction at the predetermined distance D.

In addition, in the instrument panel structure 100, in addition to the two adjacent air conditioning outlets 16, predetermined operation parts may be further arranged on the front surface 10FS of the instrument panel 10. The predetermined operation parts may be operation parts of vehicle control buttons such as a danger warning emergency button, a start/stop button, an emergency call button, a driving mode switch, etc. Accordingly, the operability of the instrument panel can be improved.

According to the above configuration, in the instrument panel structure 100 of the embodiment of the disclosure, the bracket 30 is disposed in a small space between adjacent air conditioning outlets and connected between the in-vehicle device 50 and the hanger beam member 20, so that the hanger beam member 20 can support the in-vehicle device 50. As the air conditioning outlet 16 is the terminal opening of an air conditioning duct, there is a small space between two adjacent air conditioning outlets 16 arranged on the front surface 10FS of the instrument panel 10. In the embodiment of the disclosure, this space is cleverly utilized, and the mounting extension part 22 is disposed on the existing hanger beam member 20 of the vehicle, and further through the bracket 30 which is a single member, it is possible to reduce the number of parts and simplify the assembly process, and meanwhile also increase the weight that the instrument panel structure can support without additionally disposing other components.

Figure 5:
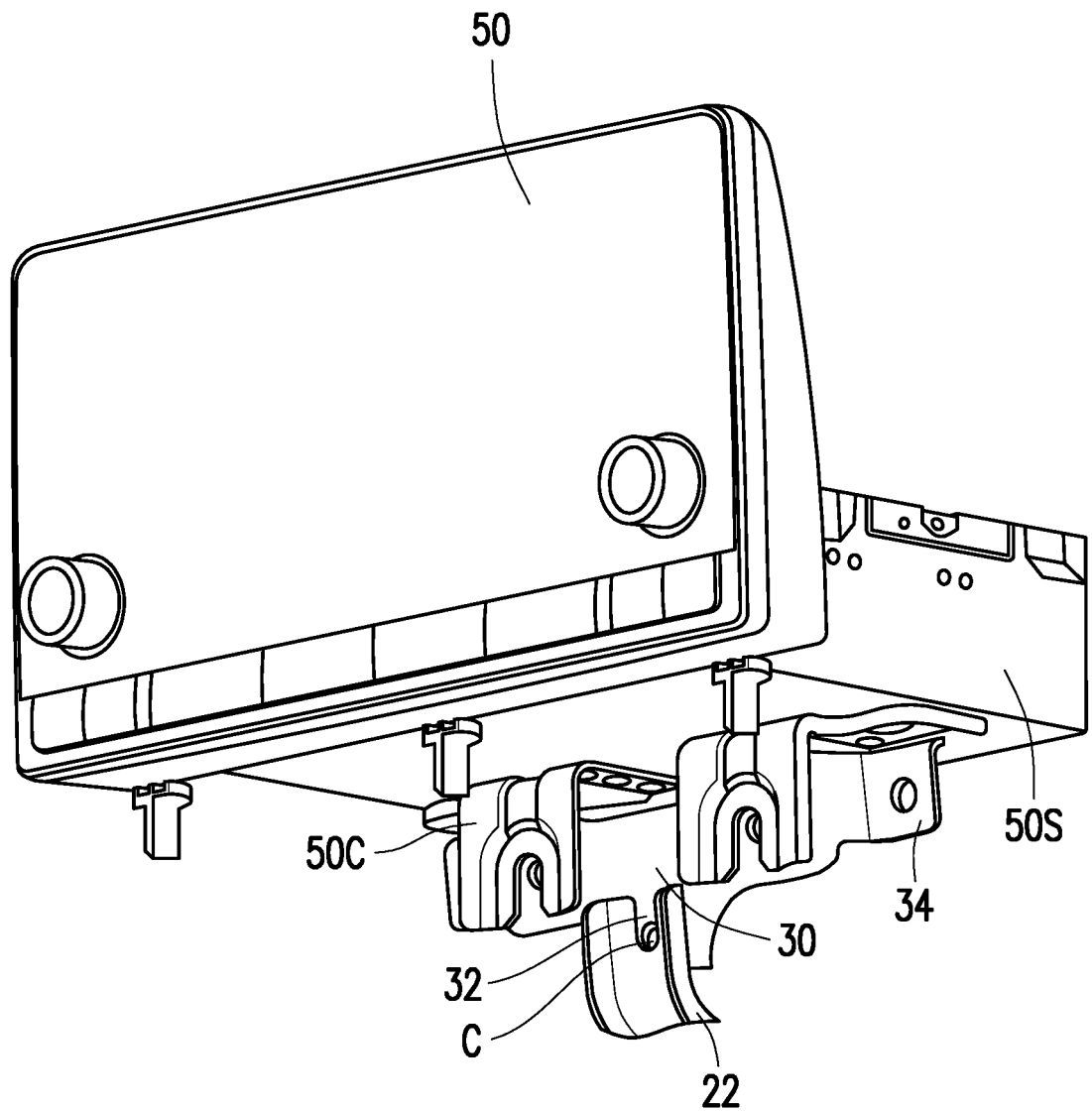
FIG. 5 is a schematic view illustrating the bracket supporting the in-vehicle device and an in-vehicle appliance thereof in an embodiment of the disclosure.

FIG. 5 is a schematic view illustrating the bracket supporting the in-vehicle device and an in-vehicle appliance thereof in an embodiment of the disclosure. In this embodiment, in addition to connecting the in-vehicle device 50 to the arm 34 of the bracket 30, the connection part 50C of the in-vehicle device 50 may further include a support part 50S configured to contain other in-vehicle appliances of the in-vehicle device 50. The in-vehicle appliance may be, for example, a controller for controlling the in-vehicle device 50, a speaker, or other in-vehicle appliances. Alternatively, the speaker or other in-vehicle appliances are not limited to being placed in the support part 50S, but may also be placed on the instrument panel middle portion 14. The support part 50S is configured as a part of the connection part 50C and is located on the back of the in-vehicle device 50, and extends toward the windshield in the front-rear direction. The support part 50S is supported by the bracket 30, is disposed in the opening 14A, and is located below the instrument panel middle portion 14 to contain the in-vehicle appliance.

According to the above configuration, since the support part 50S is configured as a part of the connection part 50C and is connected to the mounting extension part 22 of the hanger beam member 20 via the bracket 30, the hanger beam member 20 provides support to the in-vehicle appliance contained in the support part 50S, and it is possible to reduce the number of parts and simplify the assembly process, and meanwhile also increase the weight that the instrument panel structure can support.

Figure 6:
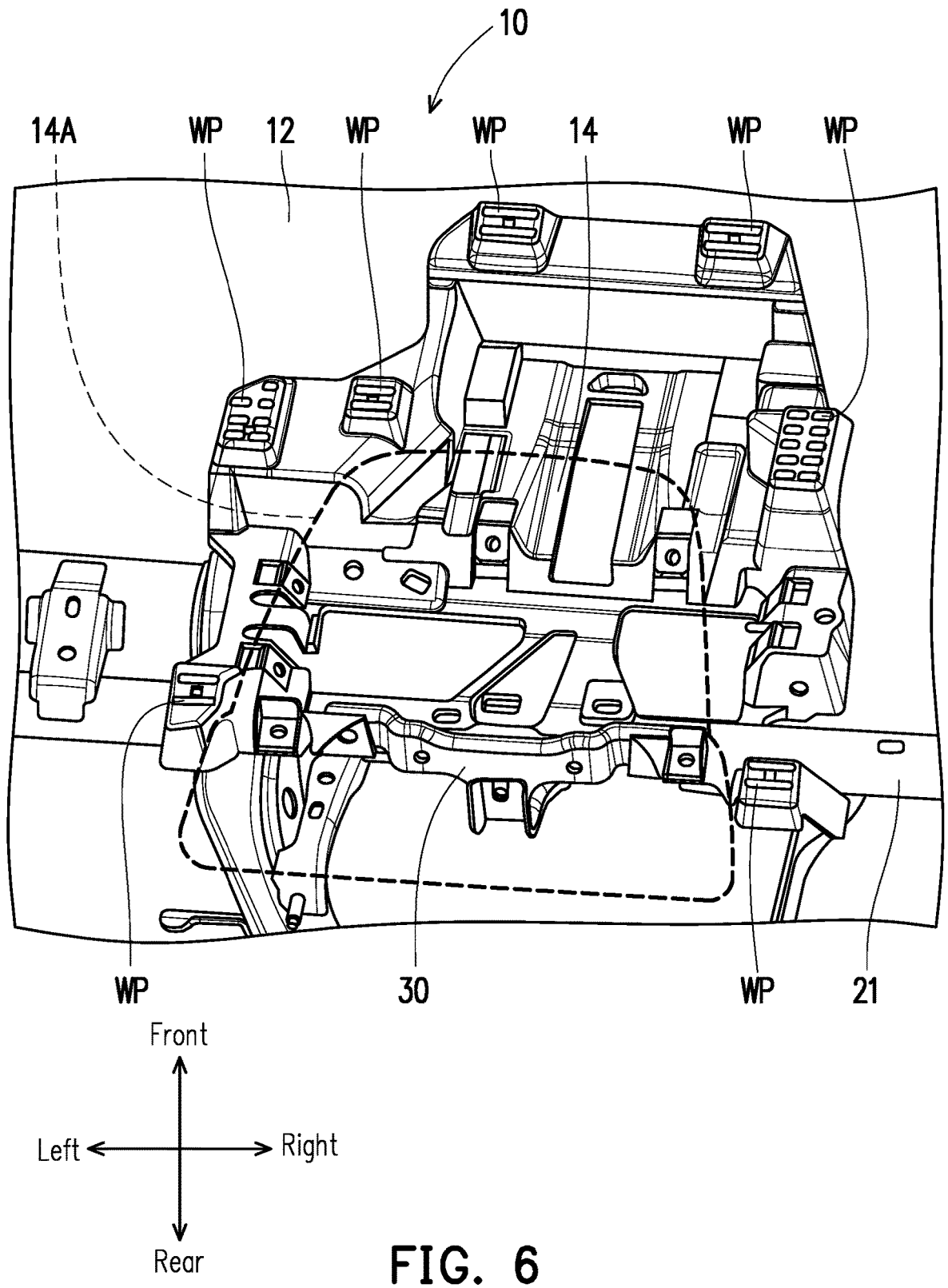
FIG. 6 is a schematic view illustrating welding and fixing between the instrument panel upper portion and the instrument panel middle portion.
Figure 7:
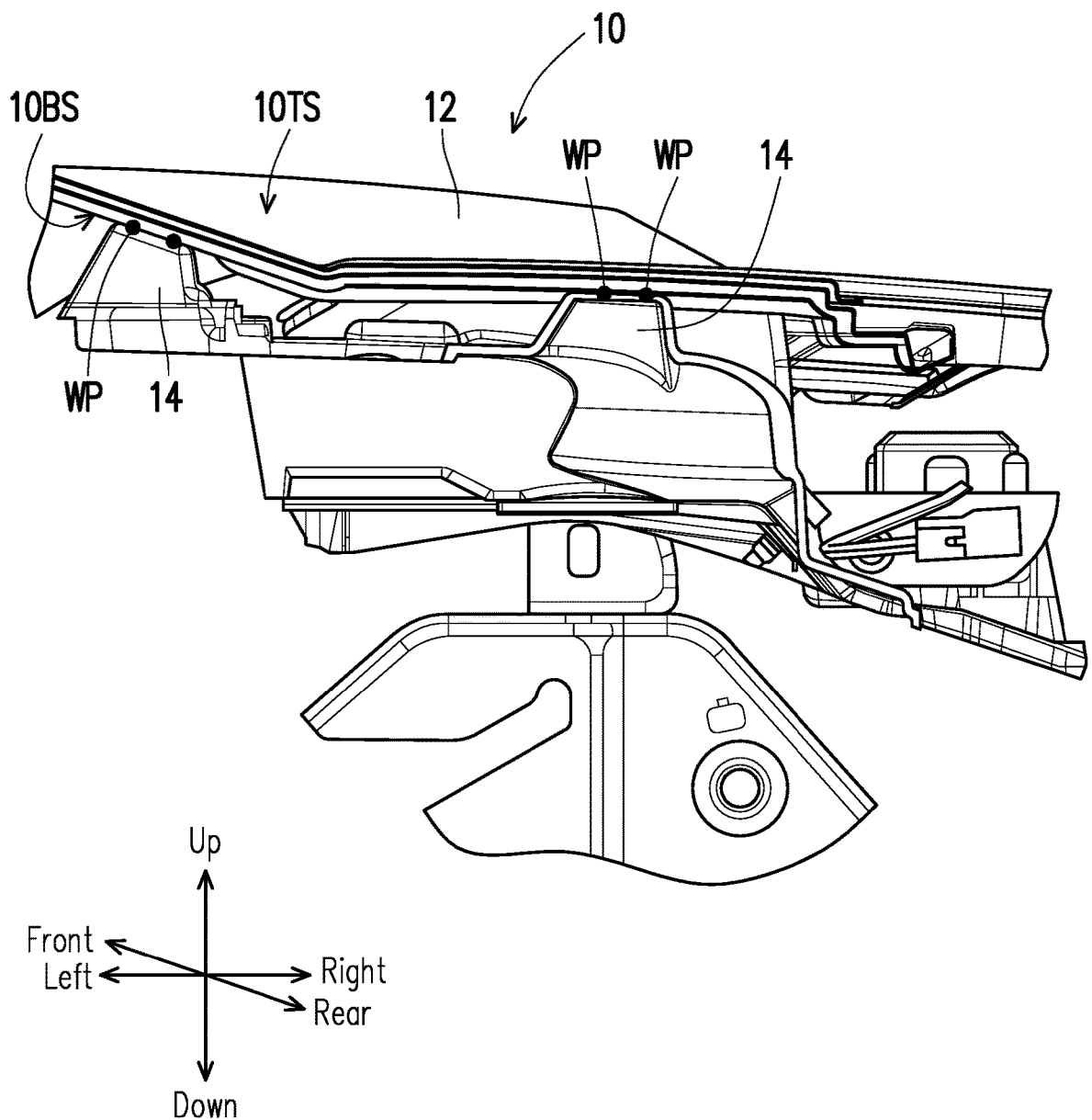
FIG. 7 is a schematic view illustrating welding and fixing between the instrument panel upper portion and the instrument panel middle portion from a perspective different from FIG. 6.

FIG. 6 is a schematic view illustrating welding and fixing between the instrument panel upper portion and the instrument panel middle portion. FIG. 7 is a schematic view illustrating welding and fixing between the instrument panel upper portion and the instrument panel middle portion from a perspective different from FIG. 6. FIG. 6 is a schematic view viewed from above the upper surface 10TS of the instrument panel 10, and FIG. 7 is a schematic view viewed from the side of the instrument panel 10. As shown in FIG. 6 and FIG. 7, in the embodiment of the disclosure, to support the instrument panel 10, the hanger beam member 20 has a plurality of extension members formed on the beam body 21 and extending toward the upper side of the vehicle, and extending to the back surface 10BS of the upper surface 10TS of the instrument panel 10. A plurality of welding fixing parts WP are formed between the instrument panel upper portion 12 and the instrument panel middle portion 14, and the plurality of welding fixing parts WP are configured to weld and fix the instrument panel upper portion 12 and the instrument panel middle portion 14 to each other. In other words, as shown in FIG. 7, when viewed from the side of the instrument panel 10, the plurality of welding fixing parts WP are located on the back surface 10BS of the upper surface 10TS of the instrument panel 10. Through the welding fixing parts WP, the instrument panel upper portion 12 and the instrument panel middle portion 14 are fixed to each other by welding so that the instrument panel 10 is supported by the hanger beam member 20.

According to the above configuration, the instrument panel upper portion 12 and the instrument panel middle portion 14 are fixed to each other by welding so that the hanger beam member 20 provides support to the instrument panel 10, which makes the fixing operation easier, reduces the number of parts, and simplifies the assembly process.

As described above, in the instrument panel structure of the vehicle of the embodiments, by disposing the bracket which is a single member in the small space between adjacent air conditioning outlets and connecting it between the in-vehicle device and the hanger beam member, the existing small space is cleverly utilized, and it is possible to reduce the number of parts and simplify the assembly process, and meanwhile also increase the weight that the instrument panel structure can support without additionally disposing other components.

The above embodiments are only used to illustrate, rather than limit, the technical solutions of the implementation of the disclosure. Although the disclosure has been described in detail with reference to the foregoing embodiments, those of ordinary skill in the art should understand that they can still modify the technical solutions described in the foregoing embodiments or make equivalent replacements to part or all technical features therein. However, these modifications or replacements do not cause the essence of the corresponding technical solutions to depart from the scope of the technical solutions of the embodiments of the disclosure.

What is claimed is:

1. An instrument panel structure of a vehicle, which is connected to a steering device of the vehicle and configured to mount an in-vehicle device, the instrument panel structure of the vehicle comprising:
    an instrument panel having an instrument panel upper portion and an instrument panel middle portion, wherein the instrument panel middle portion is located below the instrument panel upper portion and has an opening for placing the in-vehicle device;
    a hanger beam member configured to support the instrument panel and extending in a left-right direction of the vehicle and connected between a left side and a right side of a vehicle body; and
    a bracket disposed on the hanger beam member and configured to support the in-vehicle device,
    wherein the in-vehicle device and the instrument panel middle portion are connected to the hanger beam member via the bracket,
    wherein the bracket comprises an arm fixed to a connection part of the in-vehicle device.

2. The instrument panel structure of the vehicle according to claim 1, wherein
    the instrument panel has a plurality of air conditioning outlets, and two adjacent air conditioning outlets among the plurality of air conditioning outlets are arranged apart in the left-right direction and are located between the opening and the hanger beam member, and
    when viewed in a front-rear direction of the vehicle, the bracket is arranged so that a connected portion between the bracket and the hanger beam member is located between the two adjacent air conditioning outlets.

3. The instrument panel structure of the vehicle according to claim 2, wherein
    the bracket comprises a fixing part fixed to a mounting extension part of the hanger beam member, wherein the connected portion is located at the fixing part, and
    when viewed in the front-rear direction, the mounting extension part passes between the two adjacent air conditioning outlets and is located between the in-vehicle device and the hanger beam member in an up-down direction of the vehicle.

4. The instrument panel structure of the vehicle according to claim 2, wherein
    the two adjacent air conditioning outlets are arranged on a front surface of the instrument panel facing inside of a cabin, and the instrument panel further comprises a predetermined operation part formed on the front surface, and the opening of the instrument panel is formed on an upper surface of the instrument panel which extends from the front surface toward a windshield of the vehicle and faces an upper side of the vehicle.

5. The instrument panel structure of the vehicle according to claim 3, wherein the connection part of the in-vehicle device comprises a support part extending toward a windshield of the vehicle in the front-rear direction, the support part is configured to contain an in-vehicle appliance, and the support part is supported by the bracket and is located in the opening and below the instrument panel middle portion.

6. The instrument panel structure of the vehicle according to claim 1, wherein a plurality of welding fixing parts are formed between the instrument panel upper portion and the instrument panel middle portion, so that the instrument panel upper portion and the instrument panel middle portion are welded and fixed to each other.

\* \* \* \* \*